(12) United States Patent
Svardal et al.

(10) Patent No.: US 6,547,396 B1
(45) Date of Patent: Apr. 15, 2003

(54) STEREOGRAPHIC PROJECTION SYSTEM

(75) Inventors: Benny Stale Svardal, Fredrikstad (NO); Kjell Einar Olsen, Yven (NO); Odd Ragnar Andersen, Krakeroy (NO)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/040,869

(22) Filed: Dec. 27, 2001

(51) Int. Cl.[7] .................. G03B 21/00; G03B 21/14; G03B 21/28; G02B 27/22; H04N 9/47
(52) U.S. Cl. .................. 353/8; 353/10; 353/20; 353/31; 353/82; 353/84; 353/99; 353/102; 359/462; 359/464; 348/51; 348/58
(58) Field of Search .................. 353/7, 8, 10, 20, 353/31, 34, 37, 82, 84, 98, 99, 102; 359/462, 464; 348/42, 51, 54, 55, 57, 58

(56) References Cited

U.S. PATENT DOCUMENTS

| | | | | |
|---|---|---|---|---|
| 4,719,507 A | * | 1/1988 | Bos | 358/92 |
| 5,564,810 A | * | 10/1996 | Larson | 353/8 |
| 5,692,226 A | * | 11/1997 | Hall | 396/326 |
| 6,243,198 B1 | * | 6/2001 | Sedlmayr | 359/483 |
| 6,275,335 B1 | * | 8/2001 | Costales | 359/464 |
| 6,412,949 B1 | * | 7/2002 | Haldorsson | 353/8 |

OTHER PUBLICATIONS

Stupp et al., "Projection Displays", 1999, John Wiley and Sons Ltd., pp. 58–59.*
J. A. Shimizu, "Single Panel Reflective LCD Projector", Projection Displays V, Proceedings SPIE, vol. 3634, pp. 197–206, 1999.

* cited by examiner

Primary Examiner—Russell Adams
Assistant Examiner—Melissa J Koval
(74) Attorney, Agent, or Firm—Kolisch Hartwell, P.C.

(57) ABSTRACT

A projection system for projecting a stereographic image onto a viewing surface is provided, the stereographic image including a left-eye image and a right-eye image. The projection system includes a light source for producing a beam, a beam splitter for splitting the beam of light into a right image beam and a left image beam, an image engine for producing the stereographic image, and a projection lens. The image engine includes a left optical path for producing the left-eye image from the left image beam, the left optical path including an upstream left polarizer, a left image-producing element and a downstream left polarizer, and a right optical path configured to produce the right-eye image from the right image beam, the right optical path including an upstream right polarizer, a right image-producing element and a downstream right polarizer.

32 Claims, 2 Drawing Sheets

STEREOGRAPHIC PROJECTION SYSTEM

TECHNICAL FIELD

The present invention relates to a projector for displaying an image on a viewing surface. More particularly, the invention concerns a projector configured to project an image perceivable as three-dimensional by a viewer.

BACKGROUND OF THE INVENTION

In recent years, image projectors, and especially digital projectors, have found increased popularity as a tool for the presentation of many types of content to an audience. Typically, these projectors are used to project a computer-generated image onto a viewing surface. Image projectors allow a user to easily present high-quality images to audiences of a wide range of sizes. As a result, these projectors are now often found as permanent fixtures in conference rooms and other meeting facilities.

Images projected by typical image projectors generally appear flat and two-dimensional to a viewer, without any representation of depth other than the depth of field of the image. Such a representation may be suitable for many types of content. However, in some situations, it may be desirable to emphasize features of depth or texture in an image to a greater degree than is possible with a two-dimensional representation.

One way that a two-dimensional representation of an image may be given the appearance of depth is by representing the image stereographically. Stereographic images, commonly known as "three-dimensional" or "3-D" images, appear to a viewer to have a dimension of depth. These images include separate, superimposed left-eye and right-eye images configured to mimic the slight differences in the appearance of a three-dimensional object as viewed by the left and right human eyes due to the separation of the eyes on the human face. The left-eye and right-eye images are presented such that the left-eye image is not perceived by the right eye of a viewer, and the right-eye image is not perceived by the left eye, typically via the aid of optical filters worn by the viewer.

Stereographic images have long been used to enhance visual effects in movies, books, and other media. However, current methods of presenting stereographic images suffer some drawbacks that may make them unsuitable for use in a meeting room environment. For example, one way a stereographic image may be presented in a meeting room environment is by using separate image projecting systems to project the left-eye image and the right-eye image. While such a system may be successfully used to form a stereographic image, the cost and the weight of the system may be much higher than that of a single projector. Furthermore, the two projectors may require a relatively difficult and time-consuming optical alignment. Also, such a system may be particularly difficult to move between locations due to the weight and bulk of the two systems, as well as the potentially difficult image alignment problems. In a meeting room context, these drawbacks may prove to be prohibitively difficult to overcome. Therefore, there remains a need for a stereographic projection system for the display of presentations that is suitable for use in a meeting room environment.

SUMMARY OF THE INVENTION

A projection system configured to project a stereographic image onto a viewing surface is provided, the stereographic image including a left-eye image and a right-eye image. The projection system includes a light source configured to produce a beam of light, a beam splitter configured to split the beam of light into a right image beam and a left image beam, an image engine configured to produce the stereographic image, and a projection lens configured to project the left-eye image and the right-eye image onto the viewing surface. The image engine includes a left optical path configured to produce the left-eye image from the left image beam, the left optical path including an upstream left polarizer, a left image-producing element and a downstream left polarizer, and a right optical path configured to produce the right-eye image from the right image beam, the right optical path including an upstream right polarizer, a right image-producing element and a downstream right polarizer.

Another aspect of the present invention provides a projection system configured to project a stereographic image onto a viewing surface, the stereographic image being configured to be perceived as three-dimensional by a viewer and including a left-eye image and a right-eye image. The projection system includes a light source configured to produce a beam of light, an image source configured to produce the left-eye image and the right-eye image in an alternating manner when illuminated by the beam of light, a polarizer configured to polarize the beam of light, thereby imparting a polarity to the beam of light, and a variable retarder configured to change the polarity of the beam of light in an alternating manner. The variable retarder has a first state and a second state and is synchronized to the image source to be in the first state when the image source produces the left-eye image and to be in the second state when the image source produces the right-eye image.

Yet another aspect of the present invention provides a stereographic adaptor configured to be removably attached to a projection system to impart stereographic projection capabilities to a non-stereographic projection system. The projection system includes a light source configured to produce a beam of light and an image source configured to produce a left-eye image and a right-eye image in an alternating fashion when illuminated by the beam of light. The stereographic adaptor comprises a frame, a polarizer disposed within the frame, the polarizer being configured to impart a polarity to the beam of light after the beam of light leaves the projection system, and a variable retarder positioned within the frame, optically downstream of the polarizer. The variable retarder is configured to optically rotate the polarity of the beam of light in an alternating fashion such that it is synchronized with the image source.

DETAILED DESCRIPTION OF THE PREFERRED EMBODIMENTS

Figure 1:
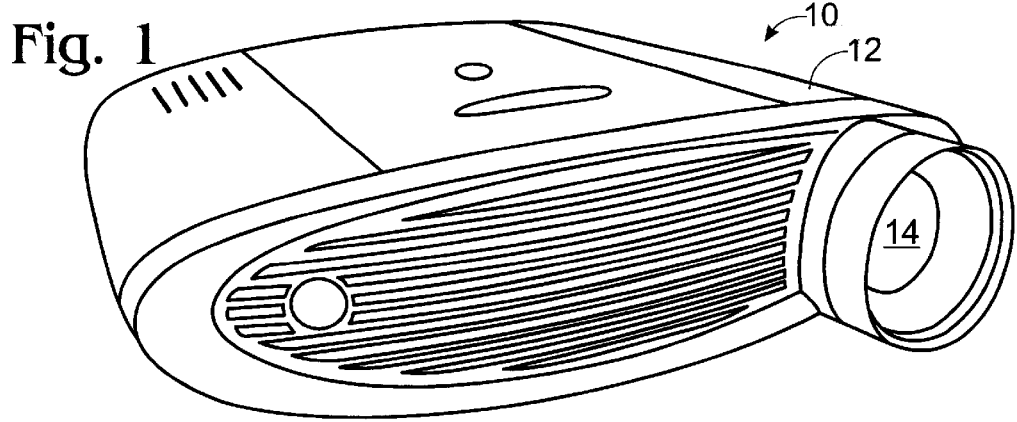
FIG. 1 is a perspective view of a projection system according to a first embodiment of the present invention.

FIG. 1 shows, generally at 10, a first embodiment of a projection system according to the present invention. Projection system 10 includes a body 12 configured to house the optical and electrical systems of projection system 10, and a projection lens 14 configured to project a stereographic image formed by the optical and electrical systems onto a viewing surface. Although projection system 10 is depicted in FIG. 1 as a portable desktop-sized system, it will be appreciated that a projection system according to the present invention may be any other desired size, portable or otherwise.

As described above, at times it may be desirable to present an image in such a manner as to show features of depth or texture in more detail than is possible with conventional projector systems. Thus, the optical and electrical systems of projection system 10 are configured to allow the projection of a stereographic image. A stereographic image is created by the projection of overlapping, but separate, left-eye and right-eye images. The left-eye and right-eye images are configured to have slight differences in perspective that mimic the differences in the perception of a three-dimensional object by a person's left eye and right eye.

The left-eye image and right-eye image are typically projected in such a manner as to have different optical properties that allow the two images to be distinguished by the right eye and the left eye. For example, the two images may be projected in different colors. In this case, a viewer may wear a color filter over each eye that allows only the correct image to reach each eye.

Another way to form a stereographic image is to project the left-eye image and right-eye image with light of different polarities. In this manner, the use of polarizing filters of the appropriate orientation in front of each eye may allow the left-eye and right-eye images to be distinguished by the left and right eyes. The projection of stereographic images with polarized light may offer some advantages over forming the images with light of different colors. For example, the use of polarity to distinguish the left-eye and right-eye images allows each image to be projected in full color. Also, polarization recovery techniques may be used to increase the intensity of the projected image, as discussed in more detail below.

Figure 2:
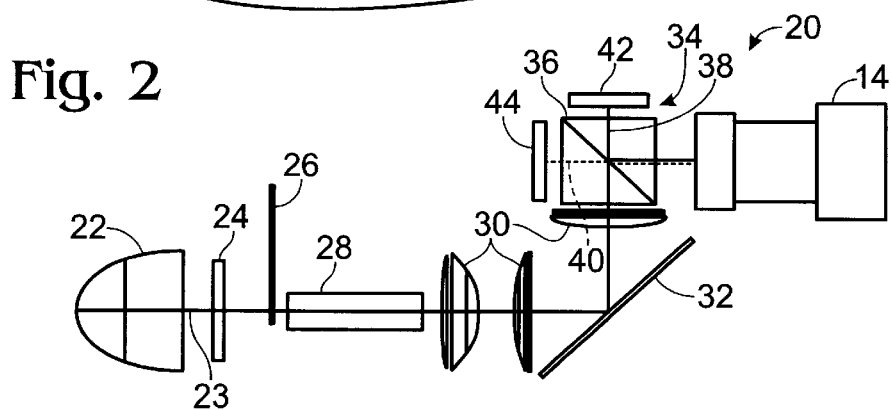
FIG. 2 is a schematic diagram of a first exemplary optical system suitable for use with the embodiment of FIG. 1.

FIG. 2 shows, generally at 20, a schematic diagram of a first exemplary optical system for projection system 10. The components of optical system 20 are described below in relative order along the overall optical path of optical system 20. First, optical system 20 includes a light source 22 configured to produce a beam of light, represented as ray 23. Light source 22 typically includes a lamp positioned within a reflector that is configured to direct most of the emitted light along the optical path of optical system 20. Light source 22 may include any suitable type of lamp. Examples include, but are not limited to, metal halide lamps and ultra-high-pressure (UHP) arc lamps. Optical system 20 may also include a filter 24, such as an infrared (IR) or ultraviolet (UV) filter, to filter out unwanted parts of the emission spectra of the lamp.

Upon exiting the light source, beam of light 23 next may be directed through a color wheel 26. A color wheel is an optical filtering device used to allow the projection of color images via the use of a single image-producing element for all three primary colors. A color wheel typically takes the form of a round, flat disk with a plurality of filters of different colors along its outer perimeter. The color wheel spins at a predetermined frequency, causing the beam of light to pass sequentially through each filter along the outer perimeter of the wheel. This changes the color of the beam of light downstream of the color wheel in a sequential manner. The image source of projection system 10 (described in more detail below) may then be configured to form a different image for each color of the light beam, and to change between the images for the different colors at the same frequency as, and in a synchronized manner with, the color wheel. In this manner, a series of different color images are projected onto the viewing surface in a sequential manner. When performed at a sufficiently high frequency, the images appear to the human eye as a single color image.

Any suitable color wheel may be used for color wheel 26. Some color wheels, known as three-color color wheels, have filters configured to pass red, green and blue light. Others, known as four-color color wheels, have these three colors, plus a clear, uncolored portion configured to pass the entire visible spectrum. This may allow more light to be delivered to the screen, and may thus allow the projection of a brighter image.

Beam of light 23 may also be passed through an integrator 28 if desired. Integrator 28 is a device configured to level the intensity distribution of beam of light 23 across the width of the beam, and thus provide the projected stereographic image a more even brightness across its width. Integrator 28 typically takes the form of an elongate, transparent rod or hollow member, and may have highly-mirrored interior surfaces. As beam of light 23 passes through integrator 28, it reflects off the internal surfaces of the integrator multiple times. This mixes the light, and gives beam of light 23 a more even intensity distribution across the width of the beam. While integrator 28 is shown positioned optically downstream of color wheel 26, it will be appreciated that the integrator may be positioned at any other suitable location within optical system 20 without departing from the scope of the present invention.

Light source 22, filter 24, color wheel 26, integrator 28, relay lenses 30 and mirror 32 may together be thought of as a beam production system. It will be appreciated that the beam production system of the depicted embodiment is merely exemplary, and that any other suitable beam production system may be used without departing from the scope of the present invention.

After passing through integrator 28, beam of light 23 may next be directed, typically via one or more relay lenses 30 and/or mirrors 32, to an image engine, indicated generally at 34. Generally, image engine 34 is configured to form the left-eye and right-eye images from beam of light 23, and to direct the left-eye and right-eye images toward projection lens 14. Where a single light source is used, a suitable beam splitter 36 may be utilized to split the beam of light into a left image beam 38 and a right image beam 40 before the left-eye and right-eye images are formed. Beam splitter 36 may either be positioned optically upstream of image engine 34, or, as shown in the depicted embodiment, may be integral with image engine 34, as explained in more detail below.

Image engine 34 of the depicted embodiment is configured to project the left-eye image and right-eye image via light of different polarities. In FIG. 2, this is accomplished via the use of a polarizing beam splitter 36 to split beam of light 23 into a first beam of a first polarity, indicated by solid ray 38, and a second beam of a second polarity, indicated by dashed ray 40. First polarized beam 38 is then directed toward a left image-producing element 42, and second polarized beam 40 is directed toward a right image-producing element 44.

Any suitable type of image-producing element may be used for left image-producing element 42 and right image-producing element 44. In the embodiment depicted in FIG. 2, each image-producing device takes the form of a reflective liquid crystal on silicon (LCOS) panel. LCOS panels, like ordinary liquid crystal panels, operate by selectively optically rotating portions of an incident beam of polarized light on a pixel-by-pixel basis. The beam of light is then passed through a downstream polarizer, which filters out either rotated or unrotated portions of the beam (depending upon the orientation of the polarizer) to form an image. Thus, an image engine using LCOS panels (or ordinary liquid crystal panels) typically also includes a polarizer positioned optically upstream of the liquid crystal material to polarize the light beam before it is directed onto the LCOS panel.

The use of LCOS panels as left image-producing element 42 and right image-producing element 44 may offer several advantages over the use of other types of image-producing elements. For example, the use of the reflective LCOS panels allows a single polarizing beam splitter 36 to act not only as the beam splitter, but also as the first, optically upstream polarizer and the second, optically downstream polarizer for each LCOS panel. Light from beam splitter 36 may be reflected from the LCOS panels directly back toward the beam splitter, without the use of any other mirrors or lenses, permitting the use of a smaller total number of optical components in optical system 20, and thus reducing the space taken by optical system 20 inside of body 12. Also, LCOS panels may offer smaller pixel sizes for a more reasonable cost than some transmissive LCD panels, and therefore may improve the resolution of the projected stereographic image while keeping the cost of the system reasonable. While the polarizing beam splitter acts as both the upstream and downstream polarizers for both LCOS panels, it will be appreciated that a projector according to the present invention may also have upstream polarizers, downstream polarizers and beam splitters as separate components without departing from the scope of the present invention. Furthermore, where separate upstream and downstream polarizers are used, it will be appreciated that a beam splitter other than a polarizing beam splitter, such as a 50/50 beam splitter or a dichroic beam splitter, may be used if desired.

When left image beam 38 strikes left image-producing element 42, selected portions of the beam that strike activated pixels on the LCOS panel are optically rotated. The reflective backing of the panel then reflects left image beam 38 back toward polarizing beam splitter 36. Optically rotated portions of left image beam 38 may then be reflected by polarizing beam 36 splitter toward projection lens 14, while unrotated portions of the beam are not reflected toward the projection lens. Likewise, when right image beam 40 strikes right image-producing element 44, selected portions of the right image beam that strike active pixels are optically rotated. The optically rotated portions of right image beam 40 then may pass through polarizing beam splitter 36 and through projection lens 14. In this manner, the optically rotated portions of left image beam 38 and right image beam 40 are projected in an overlapping manner, forming the stereographic image on the viewing surface. The stereographic image may then be viewed via the use of appropriate polarization filters. While the depicted optical system utilizes LCOS panels as left image-producing element 42 and right image-producing element 44, it will be appreciated that transmissive liquid crystal panels may also be used, along with appropriate mirrors and lenses to direct the left image beam and right image beam through the panels, without departing from the scope of the present invention.

Optical system 20 may also be configured to project ordinary two-dimensional images, simply by projecting left-eye and right-eye images of an identical perspective with left image-producing element 42 and right image-producing element 44. The use of dual image-producing elements may offer some advantages over the use of a single image-producing element for the display of two-dimensional images. For example the use of two panels may offer a higher brightness efficiency than a single panel arrangement. Also, the use of two panels may allow a higher wattage light source to be used, as each panel may receive a lower flux load that a single panel for a selected lamp wattage.

Figure 3:
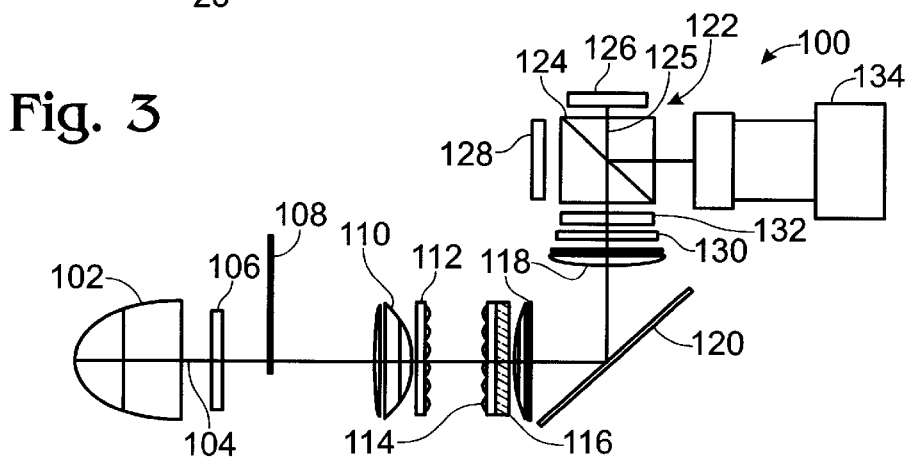
FIG. 3 is a schematic diagram of a second exemplary optical system suitable for use with the embodiment of FIG. 1, showing the projection of light of a first polarity.
Figure 4:
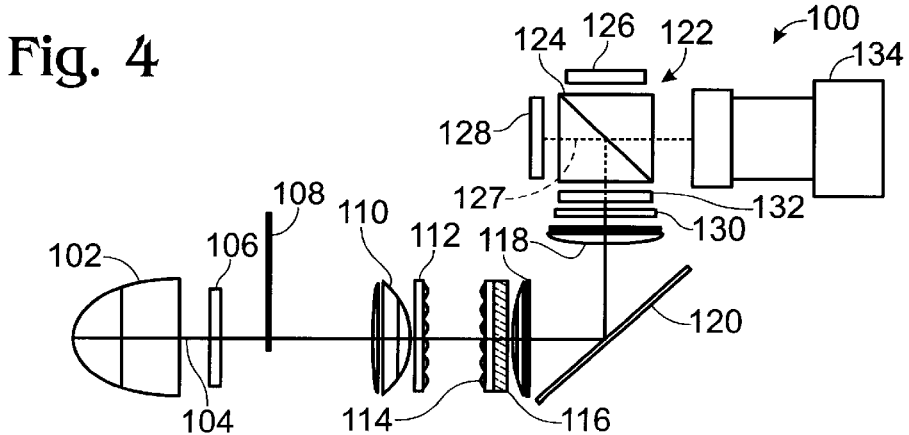
FIG. 4 is a schematic diagram of the optical system of FIG. 3, showing the projection of light of a second polarity.

The embodiment of FIG. 2 is configured to project the left-eye image and right-eye image at the same time. In another embodiment of the present invention, the left-eye image and right-eye image are projected in an alternating fashion. FIGS. 3 and 4 depict, generally at 100, an optical system configured to produce alternating left-eye and right-eye images. The frequency of the alternation between the left-eye and right-eye images is typically high enough for the images to appear as a single stereographic image to the human eye. This may offer the advantages of improved contrast between the left-eye and right-eye images and improved black-level intensity, and may provide a convenient way of achieving DC-balancing of the liquid crystal panels.

Optical system 100, shown in FIGS. 3–4, typically includes many of the same components as optical system 20 of FIG. 2. For example, optical system 100 includes a light source 102 configured to produce a beam of light, which is shown schematically as ray 104. Optical system 100 may also include a UV/IR filter 106 for filtering unwanted portions of the beam of light 104, and a color wheel 108. Furthermore, optical system 100 may include a condenser lens 110 to condense beam of light 104, and a first lens array 112, a second lens array 114 and a PCA 116 for further modifying the beam of light.

Light from PCA 116 is next directed, via one or more relay lenses 118 and mirrors 120, toward an image engine, indicated generally at 122. Image engine 122 includes a polarizing beam splitter 124, a left image-producing element 126 and a right image-producing element 128. In addition to these components, optical system 100 also includes a clean-up polarizer 130 and a variable retarder 132 positioned optically upstream of image engine 122. Clean-up polarizer 130 is configured to polarize beam of light 104, and variable retarder 132 is configured to change the polarization of beam of light 104 between a first polarization and a second polarization in an alternating fashion. Changing the polarization of beam of light 104 in an alternating manner causes polarizing beam splitter 124 to alternately direct light toward left image-producing element 126 and right image-producing element 128. Left image-producing element 126 and right image-producing element 128, in turn, are configured to alternately produce the left-eye image and the right-eye image in a manner synchronized with the changes in polarization of initial beam of light 104, thus causing the alternating projection of the left-eye and right-eye images.

Any suitable type of polarizer may be used for clean-up polarizer 130. Examples include dye-stuff sheet polarizers, wire grid polarizers, or another polarizing beam splitter. Similarly, variable retarder 132 may be any suitable device capable of changing the polarization of beam of light 104 in an alternating fashion. One example of a suitable variable retarder is a liquid crystal shutter.

Typically, variable retarder 132 has at least two states: a first state in which incident polarized light passes through without being rotated, and a second state in which incident polarized light is rotated approximately ninety degrees. Thus, when variable retarder 132 is in the first state, the beam exiting the variable retarder has a first polarization that allows it to pass through polarizing beam splitter 124 as a left image beam 125, as shown in FIG. 3. Likewise, when variable retarder 132 is in the second state, the beam exiting the variable retarder has a second polarization that causes it to be reflected by the polarizing beam splitter as a right image beam 127 toward right image-producing element 128, as shown in FIG. 4. In this manner, optical system 100 enables stereographic image projection through a single projection lens. As with the embodiment of FIG. 2, it will be appreciated that the positions of the left image-producing element and right image-producing element may be reversed, or otherwise altered, without departing from the scope of the present invention.

The use of variable retarder 132 allows the image intensity to be increased through polarization recovery. Polarization recovery is performed by splitting an unpolarized beam of light into two polarized beams, rotating the polarization of one beam to match the polarization of the other, and then recombining the beams into a single polarized beam. Thus, polarization recovery provides a polarized beam of light, with the loss of only a small amount of intensity relative to the use of an ordinary passive filter to create a polarized beam of light. In addition to polarization recovery, the brightness of the stereographic image may also be improved by increasing the power of lamp 102.

Figure 5:
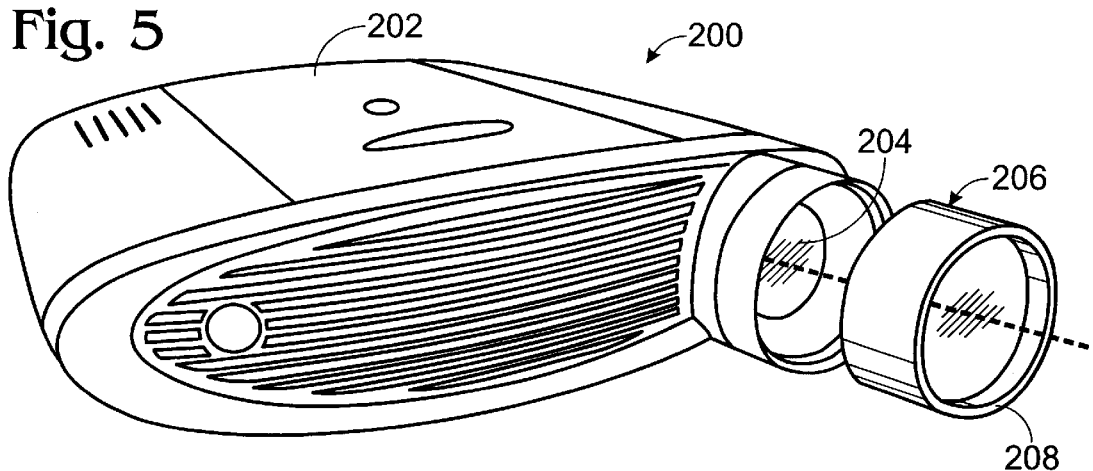
FIG. 5 is a perspective view of a projection system according to a second embodiment of the present invention.

FIG. 5 shows another embodiment of a projection system according to the present invention, generally at 200. Like the embodiment of FIG. 1, projection system 200 includes a body 202 configured to house the optical and electrical systems of projection system 200 and a projection lens 204 configured to project a stereographic image formed by the optical and electrical systems onto a viewing surface. Furthermore, projection system 200 includes a stereographic adaptor, shown generally at 206 that may be selectively removed to allow projection system 200 to be used for the projection of a non-stereographic image. Stereographic adaptor 206 includes a body or frame 208 configured to house various optical components, described in more detail below, that provide for stereographic projection capabilities.

Figure 6:
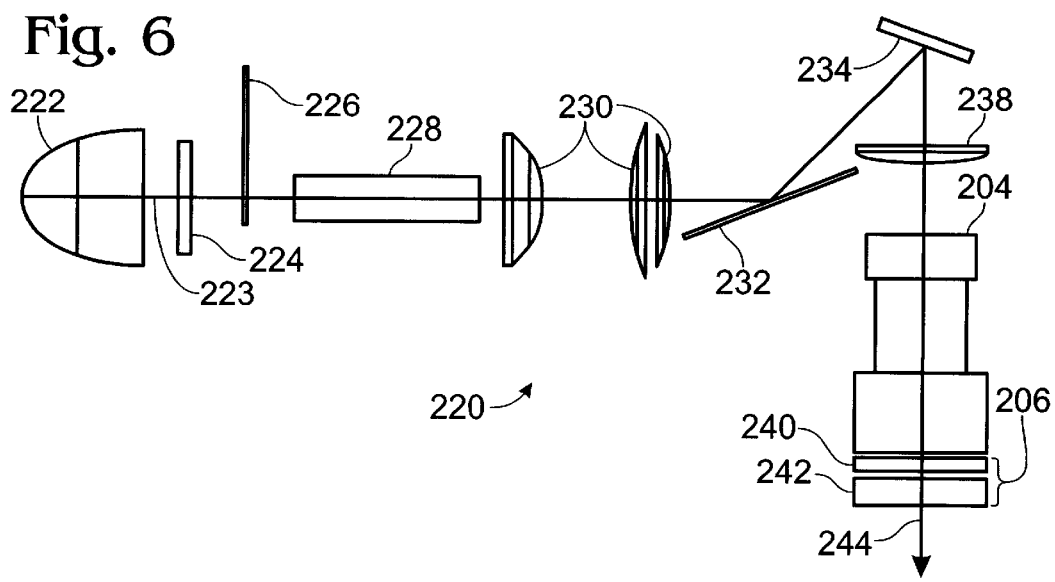
FIG. 6 is a schematic diagram of an exemplary optical system suitable for use with the embodiment of FIG. 5, showing the projection of light of a first polarity.
Figure 7:
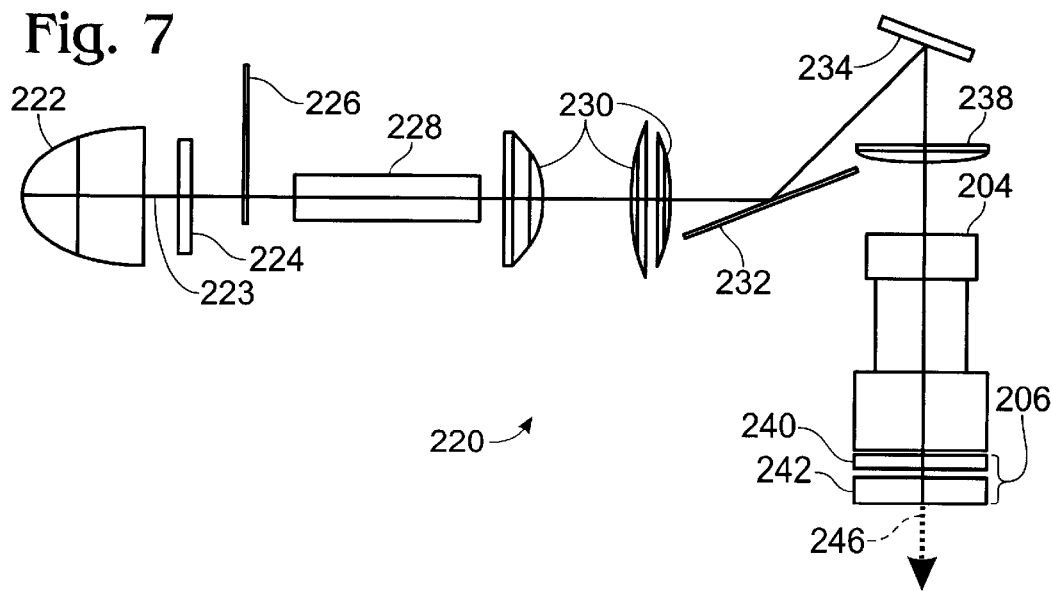
FIG. 7 is a schematic diagram of the optical system of FIG. 6, showing projection of light of a second polarity.

An exemplary optical system suitable for use with the embodiment of FIG. 5 is shown generally at 220 in FIGS. 6 and 7. As with the other embodiments described above, optical system 220 includes a light source 222 configured to produce a beam of light, represented by ray 223. Optical system 222 may also include a filter 224 such as a UV or IR filter, a color wheel 226, an integrator 228, one or more relay lenses 230, and one or more mirrors 232 for directing beam of light 223 toward an image-producing element 234.

However, unlike the other embodiments described above, however, optical system 220 has a single image-producing element 234, rather than separate image producing elements for each of the left-eye image and the right-eye image. As depicted, image-producing element 234 is a reflective image-producing element, such as a digital micromirror device (DMD) or an LCOS panel. However, it will be appreciated that any other suitable image-producing device, such as a cathode ray tube or a transmissive LCD panel, along with any appropriate mirrors and/or lenses, may be used without departing from the scope of the present invention. Optical system 220 also may include projection lens 204, and other lenses, such as a field lens 238, as desired.

The optical components of stereographic adaptor 206 are shown. positioned optically downstream of projection lens 204 in FIGS. 6 and 7. First, stereographic adaptor 226 includes a clean-up polarizer 240 configured to polarize beam of light 223 as the beam of light exits projection lens 204. Downstream of clean-up polarizer 240, optical system 220 also includes a variable retarder 242 configured to change the polarity of the light in an alternating manner. As described above for the embodiment of FIGS. 3–4, variable retarder 242 typically has at least two states, one of which passes an incident beam of polarized light without rotation, as shown in FIG. 6, and another which optically rotates the incident beam of polarized light approximately ninety degrees (or other suitable amount), as shown in FIG. 7. Variable retarder 242 is configured to switch between these two states in an alternating fashion, which causes the polarity of the light that passes through the variable retarder to alternate as a function of time. It will be appreciated that stereographic adaptor 206 may include electrical and/or mechanical connectors (not shown) that mate with complementary connectors on projector body 202 to supply power to, and allow control of, clean-up polarizer 240 and/or variable retarder 242.

Image-producing element 234 is configured to produce alternating left-eye and right-eye images, in a manner synchronized with the changes in state of variable retarder 242. In other words, image-producing element 234 is configured to produce the left-eye image whenever variable retarder 242 is the first state state, and to produce the right-eye image whenever variable retarder 242 is in the second state. In this manner, left-eye and right-eye images are projected onto the viewing surface in an alternating manner. When the frequency of alternation is sufficiently fast, the left-eye and right-eye images may appear to a viewer to compose a single stereographic image.

While stereographic adaptor 206 is shown in the depicted embodiment as being removable from projection lens 204, it will be appreciated that the stereographic adaptor may be configured to be non-removable if desired. Furthermore, it will be appreciated that clean-up polarizer 240 and variable retarder 242 may be positioned elsewhere in optical system 220 if desired. For example, clean-up polarizer 240 and variable retarder 242 may be positioned between image-producing element 234 and projection lens 236, or optically upstream of image-producing element 234, without departing from the scope of the present invention.

The placement of clean-up polarizer 240 and variable retarder 242 within removable stereographic adaptor 206 offers the advantage that the stereographic adaptor may be used to convert a non-stereographic projection system into a stereographic projection system. Suitable software may be supplied that allows a non-stereographic projection system to project alternating left-eye and right-eye images in a manner synchronized with variable retarder 242.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

We claim:

1. A projection system configured to project a stereographic image onto a viewing surface, the stereographic image including a left-eye image and a right-eye image, the projection system including:
   a light source configured to produce a beam of light;
   a polarizing beam splitter configured to split the beam of light into a right image beam and a left image beam of different polarities;
   an image engine configured to produce the stereographic image, the image engine including a left image-producing element configured to produce the left-eye image and a right image-producing element configured to produce the right-eye image, wherein the polarizing beam splitter is configured to direct the left image beam toward the left image-producing element and the right image beam toward the right image-producing element, and wherein the polarizing beam splitter is configured to recombine the left image beam and the right image beam after the production of the left-eye image and right-eye image; and
   a projection lens configured to project the left-eye image and the right-eye image onto the viewing surface.

2. The projection system of claim 1, wherein the left image-producing element is configured to optically rotate selected portions of the left image beam to form the left-eye image, and wherein the right image-producing element is configured to optically rotate selected portions of the right image beam to form the right-eye image.

3. The projection system of claim 2, wherein the polarizing beam splitter is configured to direct the left image beam and right image beam toward the projection lens after recombining the left image beam and the right image beam.

4. The projection system of claim 1, wherein the left image-producing element is configured to selectively optically rotate portions of the left image beam to form the left-eye image, and wherein the right image-producing element is configured to selectively optically rotate portions of the right image beam to form the right-eye image.

5. The projection system of claim 4, wherein the left image-producing element and right image-producing element are liquid crystal elements.

6. The projection system of claim 5, wherein the liquid crystal elements are liquid crystal on silicon elements.

7. The projection system of claim 1, wherein the left-eye image and the right-eye image are projected simultaneously onto the viewing surface.

8. The projection system of claim 1, wherein the left-eye image and the right-eye image are projected in an alternating manner onto the viewing surface.

9. The projection system of claim 8, further comprising a clean-up polarizer positioned optically upstream of the polarizing beam splitter, wherein the clean-up polarizer is configured to output a polarized beam of light.

10. The projection system of claim 9, further comprising a variable retarder positioned optically between the clean-up polarizer and the beam splitter, the variable retarder being configured to change polarization of the polarized beam of light in an alternating manner.

11. The projection system of claim 10, wherein the beam splitter is configured to direct incident light from the variable retarder along the left optical path and the right optical path in an alternating manner.

12. A desktop projection system configured to project a stereographic image onto a viewing surface, the stereographic image including a left-eye image and a right-eye image configured to be perceived as a single three-dimensional image by a viewer, the projection system comprising:
   a body;
   a light source disposed within the body, the light source being configured to produce a beam of light;
   a beam splitter disposed within the body, the beam splitter being configured to split the beam of light into a left image beam and a right image beam;
   a left image-producing element disposed within the body, the left image-producing element being configured to produce the left-eye image when illuminated by the left image beam and to reflect the left image beam back toward the beam splitter;
   a right image-producing element disposed within the body, the right image-producing element being configured to produce the right-eye image when illuminated by the right image beam and to reflect the right image beam back toward the beam splitter; and
   a projection lens configured to project the left image beam and right image beam onto the viewing surface.

13. The projection system of claim 12, wherein the liquid crystal element is a liquid crystal on silicon element.

14. The projection system of claim 12, wherein the beam splitter is a polarizing beam splitter.

15. The projection system of claim 12, wherein the beam splitter is configured to recombine the left image beam and the right image beam optically downstream of the left image-producing element and right image-producing element, and to direct the left image beam and the right image beam toward the projection lens.

16. A projection system configured to project a stereographic image onto a viewing surface, the stereographic image being configured to be perceived as a single three-dimensional image by a viewer and including a left-eye image and a right-eye image, the projection system comprising:
   a light source configured to produce a beam of light;
   a projection lens configured to project the stereographic image onto the viewing surface;
   a polarizing beam splitter disposed optically between the light source and projection lens, the polarizing beam splitter being configured to split the beam of light into a polarized left image beam and a polarized right image beam;
   a left image-producing element disposed optically between the polarizing beam splitter and the projection lens, the left image-producing element being configured to produce the left eye image and to direct the left image beam back toward the polarizing beam splitter; and a right image-producing element disposed optically between the polarizing beam splitter and the projection lens, the right image-producing element being configured to produce the left-eye image and to direct the right image beam back toward the polarizing beam splitter.

17. The projection system of claim 16, wherein the polarizing beam splitter is configured to recombine the left image beam and right image beam for projection.

18. The projection system of claim 16, wherein the left image beam is directed onto the left image-producing element and the right image beam is directed onto the right image-producing element simultaneously.

19. The projection system of claim 16, wherein the left image beam is directed onto the left image-producing element and the right image beam is directed onto the right image-producing element in an alternating manner.

20. The projection system of claim 19, further comprising a clean-up polarizer configured to output a polarized beam of light.

21. The projection system of claim 20, further comprising a variable retarder optically positioned between the light source and the polarizing beam splitter, wherein the variable retarder is configured to change the polarity of the polarized beam splitter in an alternating manner.

22. A projection system configured to project a stereographic image onto a viewing surface, the stereographic image being configured to be perceived as a single three-dimensional image by a viewer and including a left-eye image and a right-eye image, the projection system comprising:
   a light source configured to produce a beam of light;
   an image engine configured to produce the left-eye image and the right-eye image in an alternating manner when illuminated by the beam of light;
   a polarizer configured to polarize the beam of light, thereby imparting a polarity to the beam of light; and
   a variable retarder configured to change the polarity of the beam of light in an alternating manner, the variable retarder having a first state and a second state and configured to be synchronized to the image source to be in the first state when the image source produces the left-eye image and to be in the second state when the image source produces the right-eye image.

23. The projection system of claim 22, wherein the variable retarder is positioned optically upstream of the image source.

24. The projection system of claim 23, wherein the image engine includes a left image-producing element configured to produce the left-eye image, and a right image-producing element configured to produce the right-eye image.

25. The projection system of claim 24, wherein the left image-producing element and the right image-producing element are liquid crystal on silicon elements.

26. The image projection system of claim 24, further comprising a polarizing beam splitter positioned optically downstream of the variable retarder, wherein the polarizing beam splitter is configured to split the beam of light into a left image beam and a right image beam, to direct the left image beam toward the left image-producing element and the right image beam toward the right image-producing element, to recombine the left image beam and right image beam, and to direct the recombined left image beam and right image beam toward the projection lens.

27. The projection system of claim 22, wherein the variable retarder is positioned optically downstream of the image source.

28. The projection system of claim 27, wherein the image engine includes a single image-producing element configured to produce the left-eye image and the right-eye image in an alternating manner.

29. The projection system of claim 28, wherein the image-producing element is a digital micromirror device.

30. The projection system of claim 22, wherein the variable retarder is a liquid crystal shutter.

31. The projection system of claim 22, further comprising a projection lens, wherein the polarizer and the variable retarder are configured to be removably mounted to the projection system downstream of the projection lens.

32. A stereographic adaptor configured to be attachable to a projection system to impart stereographic projection capabilities to a non-stereographic projection system, the projection system including a light source configured to produce a beam of light and an image source configured to produce a left-eye image and a right-eye image in an alternating fashion from the entire beam of light when illuminated by the beam of light, the stereographic adaptor comprising:
   a frame;
   a polarizer disposed within the frame, the polarizer being configured to impart a polarity to the beam of light after the beam of light leaves the projection system; and
   a variable retarder positioned within the frame optically downstream of the polarizer, the variable retarder being configured to optically rotate the polarity of the beam of light in an alternating fashion, synchronized with the image source.

* * * * *